(12) United States Patent
Hermann et al.

(10) Patent No.: US 7,120,421 B2
(45) Date of Patent: Oct. 10, 2006

(54) WIRELESS NETWORK WITH A CIPHER KEY CHANGE PROCEDURE

(75) Inventors: Christoph Hermann, Aachen (DE); Josef Wasel, Bedburg (DE)

(73) Assignee: Koninklijke Philips Electronics, N. V. Eindhoven (NL)

( * ) Notice: Subject to any disclaimer, the term of this patent is extended or adjusted under 35 U.S.C. 154(b) by 0 days.

(21) Appl. No.: 11/142,607

(22) Filed: Jun. 1, 2005

(65) Prior Publication Data

US 2005/0282521 A1    Dec. 22, 2005

Related U.S. Application Data

(63) Continuation of application No. 09/718,247, filed on Nov. 22, 2000, now Pat. No. 6,980,795.

(30) Foreign Application Priority Data

| Nov. 29, 1999 | (DE) | ............................. 199 57 387 |
| Dec. 2, 1999 | (DE) | ............................. 199 58 004 |
| Jan. 19, 2000 | (DE) | ............................. 100 02 183 |
| Jan. 21, 2000 | (DE) | ............................. 100 02 636 |
| Mar. 28, 2000 | (DE) | ............................. 100 15 389 |

(51) Int. Cl.
*H04M 1/66* (2006.01)
*H04K 1/00* (2006.01)

(52) U.S. Cl. ...................... 455/410; 455/411; 380/247; 713/171

(58) Field of Classification Search ................ 455/410, 455/411, 435.1, 414.1, 422.1, 432.2; 380/247, 380/249, 250, 277, 278, 279; 713/171
See application file for complete search history.

(56) References Cited

U.S. PATENT DOCUMENTS

| 5,146,498 | A | * | 9/1992 | Smith ........................ 380/273 |
| 5,412,722 | A | | 5/1995 | Sherly et al. |
| 5,546,464 | A | | 8/1996 | Raith et al. |
| 5,574,785 | A | * | 11/1996 | Ueno et al. ..................... 380/2 |
| 5,841,873 | A | * | 11/1998 | Lockhart et al. ............ 713/181 |
| 6,215,875 | B1 | | 4/2001 | Nohda |
| 6,892,940 | B1 | * | 5/2005 | Kocarev et al. ............ 235/380 |

OTHER PUBLICATIONS

By Mouly & Marie-Bernadeete Pautet, Entitled: The GSM System For Mobile Communicaitons Verlag Cell & Sys, 1992, pp. 391-395.
3GPP: "3rd Generation Partnership Project (3GPP): Technical Specification Group (TSG) Ran; Working Group 2 (WG2); Ciphering Procedure on the Radio . . . " Aug. 1999, pp. 1-5.
3GPP: "3rd Generation Partnership Project (3GPP); Technical Specification" TS25.331 V1.3.1, Online.

* cited by examiner

*Primary Examiner*—Joseph Feild
*Assistant Examiner*—Huy D Nguyen

(57) ABSTRACT

The invention relates to a wireless network comprising a radio network controller and a plurality of assigned terminals which are provided for coding certain data to be transmitted over traffic and control channels and which are provided for changing the respective key necessary for the coding at certain instants. The radio network controller sends a message about a change of the key coded with an old cipher key to a terminal. The terminal responds with a message coded with a new cipher key as an acknowledgement for the new cipher key.

25 Claims, 12 Drawing Sheets

WIRELESS NETWORK WITH A CIPHER KEY CHANGE PROCEDURE

CROSS REFERENCE TO RELATED APPLICATION

This is a continuation of prior application Ser. No. 09/718,247 filed Nov. 22, 2000 now U.S. Pat No. 6,980,795.

The invention relates to a wireless network comprising a radio network controller and a plurality of assigned terminals, which are provided for coding certain data to be transmitted and for changing at certain instants the respective cipher key necessary for the coding.

From the title "The GSM System for Mobile Communications" by Michel Mouly and Marie-Bernadette Pautet, Verlag Cell & Sys, 1992, pp. 391 to 395 is known that data are transmitted in coded form between a radio network controller and a terminal. The cipher key necessary for the transmission is changed with certain time spaces. For this purpose, a three-step procedure is provided.

It is an object of the invention to provide a wireless network that has a different cipher change procedure.

The object is achieved by a wireless network of the type defined in the opening paragraph, in that the radio network controller is provided for transmitting a message coded with an old cipher key to a terminal, which message is about a cipher key change and in that the terminal is provided for transmitting to the radio network controller a message coded with a new cipher key as an acknowledgement of the new cipher key.

The wireless network according to the invention is understood to be a network having a plurality of radio cells in which a respective radio network controller and a plurality of terminals transmit control data and payload data in a wireless fashion. A wireless transmission is used for transmitting information signals, for example, via radio, ultrashell or infrared paths.

According to the invention, a terminal acknowledges a message coded with a new cipher key, which message is about a change of the cipher key (for example, cipher change command) by transmitting a message coded with the new cipher key (for example, acknowledgement of cipher key command). When the terminal has falsely been informed of the new cipher key, no command to acknowledge the cipher key can be detected. Therefore, the new cipher key cannot be used.

Examples of embodiment of the invention will be further explained hereinafter with reference to the Figures in which.

Figure 1:
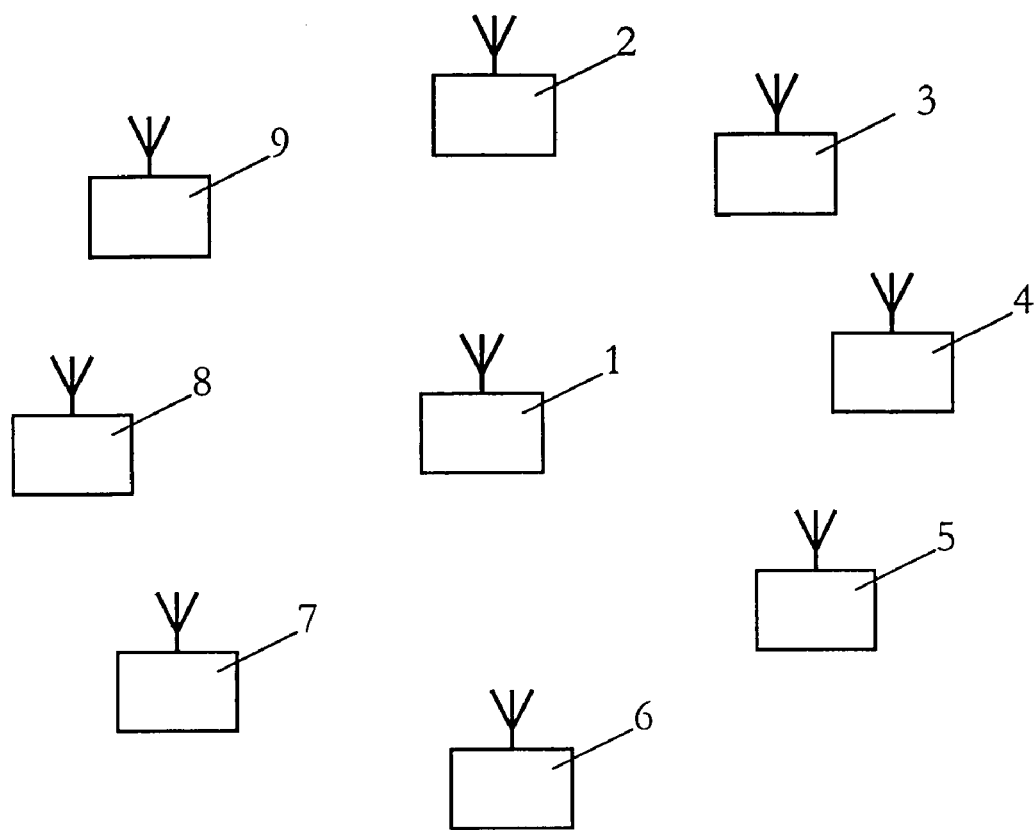
FIG. 1 shows a wireless network comprising a radio network controller and a plurality of terminals.

FIG. 1 is a wireless network, for example, a radio network, comprising a radio network controller (RNC) 1 and a plurality of terminals 2 to 9. The radio network controller 1 is responsible for controlling all the components taking part in the radio traffic, such as, for example, the terminals 2 to 9. An exchange of control and payload data takes place at least between the radio network controller 1 and the terminals 2 to 9. The radio network controller 1 establishes a respective link for transmitting payload data.

As a rule, the terminals 2 to 9 are mobile stations and the radio network controller 1 is fixedly installed. A radio network controller 1 may also be movable or mobile, respectively.

In the wireless network are transmitted, for example, radio signals according to the FDMA, TDMA or CDMA method (FDMA=Frequency-Division Multiple Access, TDMA=Time-Division Multiple Access, CDMA=Code-Division Multiple Access), or according to a combination of the methods.

According to the CDMA method, which is a special code-spreading method, binary information (data signal) originating from a user is modulated each time with a different code sequence. Such a code sequence comprises a pseudo-random square-wave signal (pseudo-noise code) whose rate, also referred to as chip rate, is generally considerably higher than that of the binary information. The duration of a square-wave pulse of the pseudo-random square-wave signal is referred to as chip interval $T_C$. $1/T_C$ is the chip rate. The multiplication or modulation respectively, of the data signal by the pseudo-random square-wave signal results in a spreading of the spectrum by the spreading factor $N_C=T/T_C$, where T is the duration of a square-wave pulse of the data signal.

Payload data and control data are transmitted between at least one terminal (2 to 9) and the radio network controller 1 via the channels predefined by the radio network controller 1. A channel is determined by a frequency range, a time range and, for example, in the CDMA method, by a spreading code. The radio link from the radio network controller 1 to the terminals 2 to 9 is referred to as a downlink and from the terminals to the radio network controller as an uplink. Thus, data are transmitted from the radio network controller to the terminals over downlink channels and from terminals to the radio network controller over uplink channels.

There may be provided a downlink control channel, which is used for broadcasting control data from the radio network controller 1 to al the terminals 2 to 9 prior to a connection set-up. Such a channel is referred to as downlink broadcast control channel. For transmitting control data from a terminal 2 to 9 to the radio network controller 1 prior to a connection set-up, for example an uplink control channel assigned by the radio network controller 1 can be used which, however, can also be accessed by other terminals 2 to 9. An uplink channel that can be used by various or all the terminals 2 to 9 is referred to as a common uplink channel. After a connection set-up, for example between the terminals 2 to 9 and the radio network controller 1, payload data are transmitted over a downlink and an uplink user channel. Channels that are set up between only one transmitter and one receiver are referred to as dedicated channels. As a rule, a user channel is a dedicated channel which can be accompanied with a dedicated control channel for transmitting link-specific control data.

To include a terminal 2 to 9 in a radio network controller 1, a contention channel is sufficient, which will be referred to as signalized RACH channel (RACH=Random-Access Channel). Also data packets can be transmitted over such a signalized RACH channel.

In order that payload data can be exchanged between the radio network controller 1 and a terminal, it is necessary for a terminal 2 to 9 to be synchronized with the radio network controller 1. For example, it is known from the GSM system (GSM=Global System for Mobile communications), in which a combination of FDMA and TDMA methods is used, that a time-dependent position of a frame is determined (frame synchronization) based on predefined parameters after a suitable frequency range has been determined, which frame synchronization helps in sequencing the data transmission. Such a frame is always necessary for the data synchronization of terminals and radio network controller in the case of TDMA, FDMA and CDMA methods. Such a frame may contain various sub-frames or, together with several other successive frames, form a superframe. For simplicity, a frame which is referred to as a reference frame, is started from.

Figure 2:
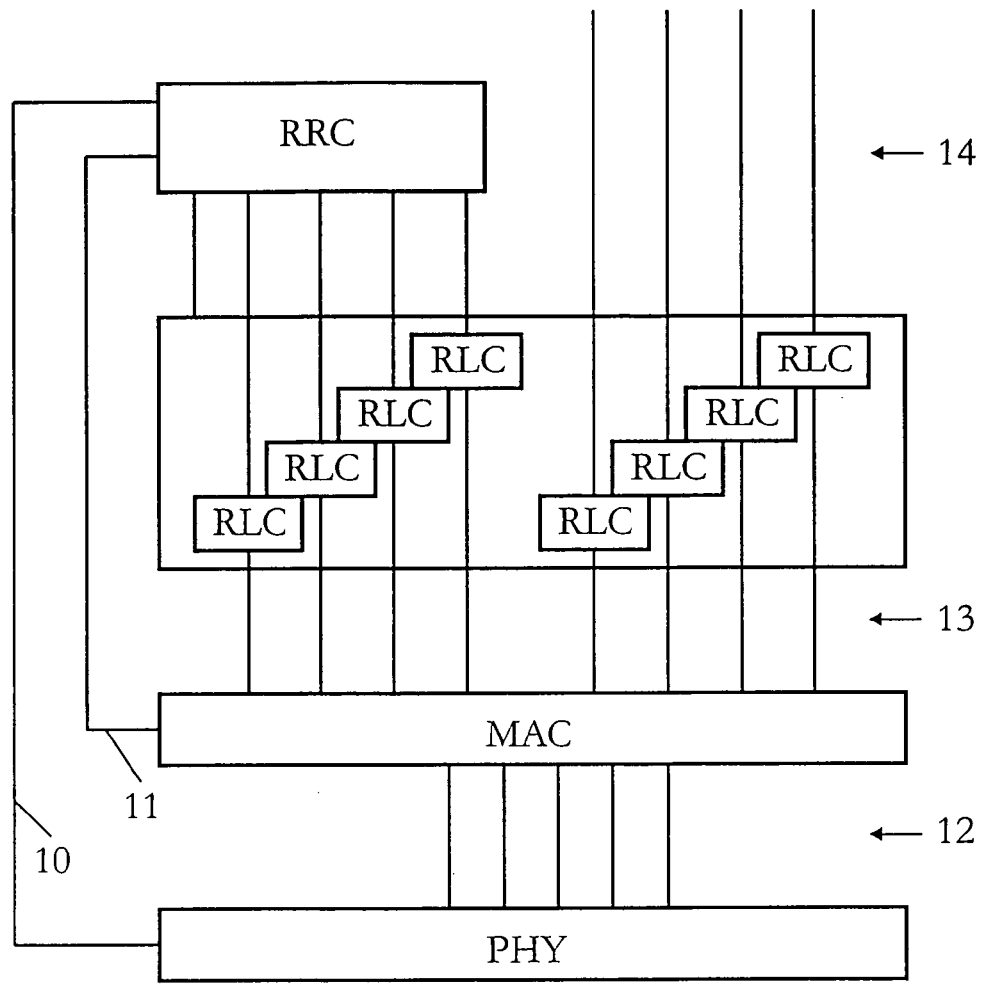
FIG. 2 shows a layer model to explain various functions of a terminal or of a radio network controller.

The exchange of control data and payload data via the radio interface between the radio network controller 1 and the terminals 2 to 9 can be explained with reference to the layer model or protocol architecture shown in FIG. 2 (compare, for example, $3^{rd}$ Generation Partnership Project (3GPP); Technical Specification Group (TSG) RAN; Working Group 2 (WG2); Radio Interface Protocol Architecture; TS 25.301 V3.2.0 (1999-10)). The layer model comprises three protocol layers: the physical layer PHY, the data link layer with the sub-layers MAC and RLC (in FIG. 2 various shapes of the sub-layer RLC are shown) and the layer RRC. The sub-layer MAC is for the medium access control, the sub-layer RLC for the radio link control and the layer RRC for the radio resource control. The layer RRC is responsible for the signaling between the terminals 2 to 9 and the radio network controller 1. The sub-layer RLC is used for controlling a radio link between a terminal 2 to 9 and the radio network controller 1. The layer RRC controls the layers MAC and PHY via control links 10 and 11. Thus the layer RRC can control the configuration of the layers MAC and PHY. The physical layer PHY offers transport links to the layer MAC. The layer MACrenders logic connections 13 available to the layer RLC. The layer RLC can be reached by applications via access point 14.

Figure 3:
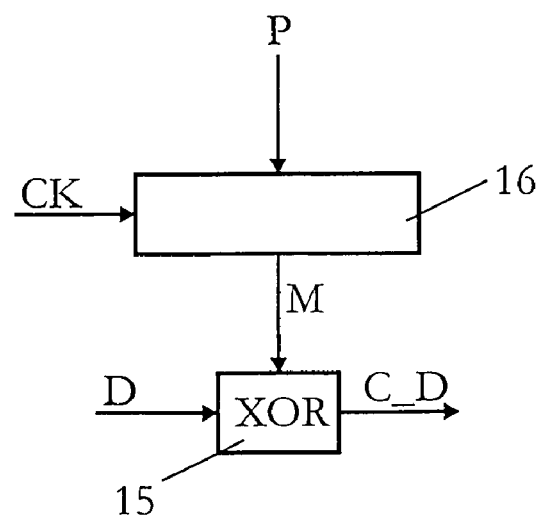
FIG. 3 shows a block diagram to explain the coding mechanism in a terminal or in a radio network controller.

In such a wireless network, the data are transmitted via the radio interface in a coded form for reasons of security and confidentiality, to avoid being tapped in an unauthorized manner. The coding is executed in the data connection layer (for example in the layer RLC or MAC). As shown in FIG. 3, the data D are combined with a coding mask M via an exclusive-OR function (XOR), so that a coded data stream C_D is the result. The coding mask M is formed in a coding function 16 which works according to a coding algorithm and receives as input values the cipher key CK and other parameters P not further shown here.

The cipher key must be known both to the radio network controller 1 and to the terminals 2 to 9. This cipher key is changed at certain instants (for example, every other hour) with a special procedure which is referred to as cipher key change.

Figure 4:
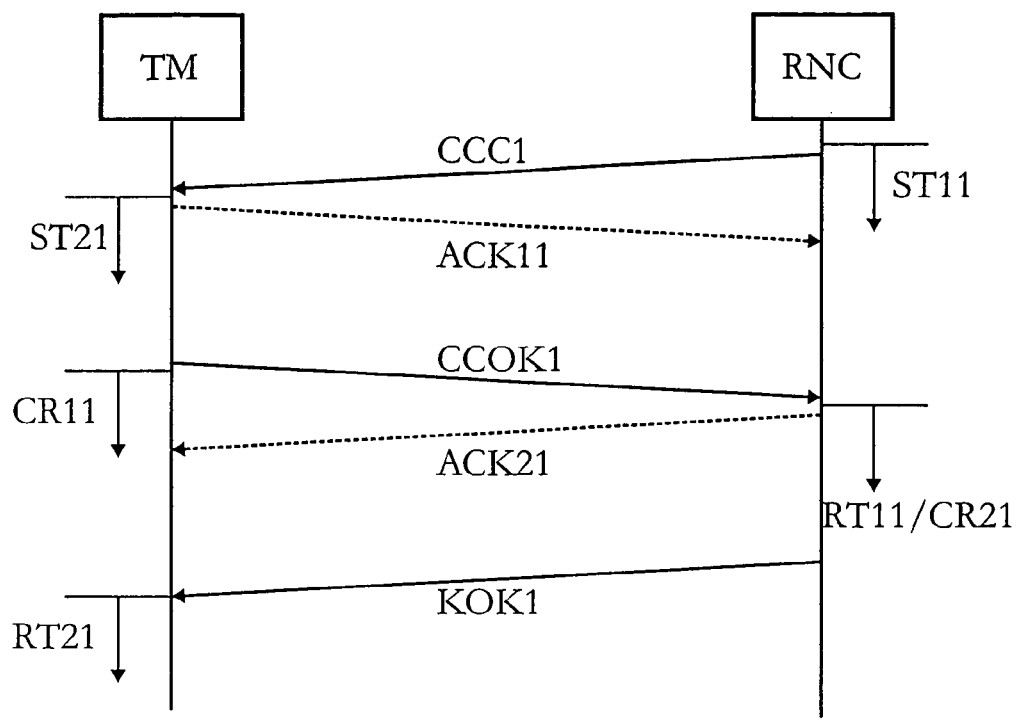
FIGS. 4 to 14 show routines of various commands during a procedure to change the cipher key necessary for the coding.

In the following will be represented five different cipher key changes CKC1 to CKC5. With the aid of FIG. 4 the first procedure CKC1 will be explained. With this first procedure, the new cipher key is co-transmitted, which is in contrast to the other four procedures CKC2 to CKC5. First the radio network controller 1 (in FIG. 1 referred to as RNC) stops each transmission of data to the terminal (downlink), which data are to be coded (ST11). The only exception is a cipher change command CCC1 to be described hereinafter. Received uplink data are further demasked with the thus far valid cipher key. Then the radio network controller 1 (RNC) sends to the terminal (in FIG. 4 referred to as TM) the cipher change command CCC1 with a new cipher key over a signaling channel (coded with the old cipher key). As to security it is unimportant whether data, which were transmitted and coded with the old cipher key prior to the change CKC, but remained unacknowledged (no acknowledgement), are coded with the new cipher key when there is a renewed transmission after the change CKC1.

After the terminal has received the cipher change command CCC1 with the new cipher key, only one acknowledgement command ACK11 is transmitted to the radio network controller 1, so that the radio network controller 1, after a defined period of time, does not again transmit the cipher change command CCC1 with the new cipher key. Each transmission of data (uplink) which are to be coded, is also stopped by the terminal (ST21). The only exception is a cipher key acknowledgement command CCOK1 to be described in the following, which is coded with the old cipher key. After the respective terminal has taken the cipher key from the cipher change command CCC1, the key taken from the cipher change command CCC1 by the terminal is registered as a new cipher key and transmitted together with a cipher key acknowledgement command CCOK1 to the radio network controller 1. After the transmission of the key acknowledgement command CCOK1 the terminal is in a position to receive and decipher data with the old and new cipher keys. The old cipher key is only necessary when a renewed cipher change command CCC1 is received, which has been coded with the old cipher key. This takes place when the cipher key contained in the cipher key acknowledgement command CCOK1 differs from the originally transmitted cipher key, for example, as a result of a transmission error.

The reception of the key acknowledgement command CCOK1 is announced to the terminal by the radio network controller 1 by means of an acknowledgement command ACK21 and the data transmission (downlink) to the terminal is resumed with the new cipher key. This resumption takes place only when the originally transmitted key (ST11) corresponds to the key contained in the key acknowledgement command CCOK1. Received data are then also demasked with the new cipher key (CR21). The radio network controller 1 then sends a match command KOK1 to the terminal. As observed earlier, the transmission of the cipher change command CCC1 is to be repeated when the cipher keys do not match. After this match command KOK1 is received, or data (downlink) which have been coded with the new cipher key, the terminal starts the data transmission (uplink) with the new cipher key (RT21). This terminates the procedure CKC1 and thus the data transmission is effected with only this cipher key.

As a result of the fact that the terminal deciphers data received between CR11 and RT21 both with the old and the new cipher key, the terminal may recognize whether the procedure CKC1 was terminated successfully (then the terminal receives the match command KOK1 coded with the old cipher key), or whether the procedure is to be started anew (in that case the terminal receives the cipher change command CCC1 which, for example, contains again a new cipher key). This avoids that as a result of a key that is falsely received from the terminal all connections between terminal and network are broken off.

The described procedure CKC1 in the first instance relates only to the signaling link. Data links which also work with transmission repetitions are included in the procedure in that their respective layers RLC are also informed of a stop command (terminal: ST21, network ST11) or a command to resume the transmission of payload data (terminal: RT21, network: RT11/CR21).

Figure 5:
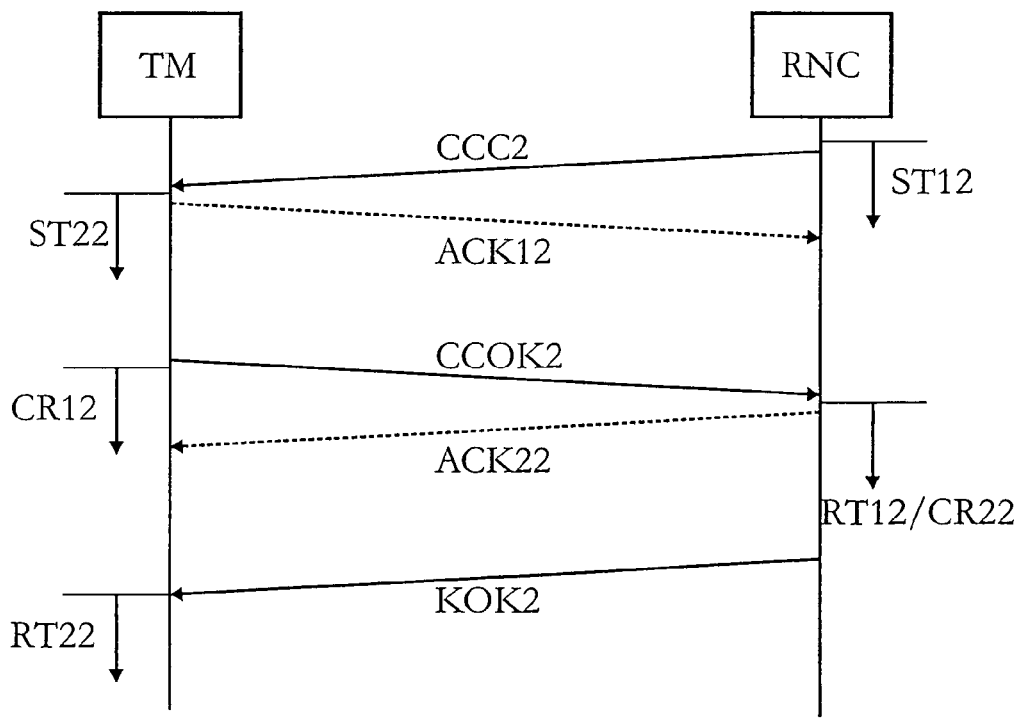

The second cipher key change CKC2 is explained with reference to FIG. 5. With this change CKC2 the terminal (TM) receives the information about the new cipher key in a separate data exchange procedure (not further shown here).

It is then avoided that the cipher key itself is transmitted over the radio interface. With this change CKC2 a synchronized change from the old to the new cipher key is effected between terminal and radio network controller 1 (RNS). First, each transmission to the terminal (downlink) of data which are to be coded is stopped by the radio network controller 1 (ST12). The only exception is a cipher change command CCC2 to be described in the following. Received uplink data are furthermore coded with the cipher key used thus far. Then the cipher change command CCC2 (coded with the old cipher key) is transmitted over a signaling channel to the terminal by the radio network controller 1. As to security it is unimportant whether data, which were transmitted and ciphered with the old cipher key prior to the change CKC2, but remained unacknowledged (no acknowledgement), are coded with the new cipher key when there is a renewed transmission after the procedure CKC2.

After the terminal has received the cipher change command CCC2, only an acknowledge command ACK12 is transmitted to the radio network controller 1 so that the radio network controller 1 does not again transmit the cipher change command CCC2 after a specific period of time. Each transmission of data (uplink) which are to be coded is also stopped by the terminal (ST22). The only exception is a cipher key acknowledge command CCOK2 to be described in the following, which is coded with the new cipher key. After the transmission of the cipher key acknowledge command CCOK2, the terminal is ready to receive and decipher (CR12) data both with the old and new cipher keys. After the cipher change command CCC2 has been sent and the acknowledge message ACK12 has been received, the radio network controller 1 is ready to decipher data both with the new cipher key and with the old cipher key. After ACK12 has been received, the radio network controller 1 expects only the cipher key acknowledge command CCOK2 that was coded with the new cipher key. If the deciphering of this command in the radio network controller 1 does not provide a useful content (i.e. the radio network controller cannot recognize without any doubt that it is the command CCOK2), because the terminal has used a false new cipher key for the coding, the radio network controller 1 may recognize that the terminal has been informed of a false new cipher key. The deciphering of this command CCOK2 with the old cipher key produces no useful content either. This second false coding result provides additional certainty for the radio network controller that the terminal knows a false new cipher key.

The reception of the cipher key acknowledge command CCOK2 is announced to the terminal by the radio network controller 1 by means of an acknowledge command ACK22. Whereas the deciphering of CCOK2 with the new cipher key disclosed that CCOK2 was received, the radio network controller 1 again takes up the data transmission (downlink) to the terminal with the new cipher key (RT12). Received data are demasked only with the new cipher key. The radio network controller 1 then sends the terminal a match command KOK2 that is coded with the new cipher key.

If no cipher acknowledge command CCOK2 could be deciphered (as described above), again only the old cipher key is used both for reception and transmission (RT12/CR22). The radio network controller 1 then sends a match command KOK2 to the terminal which is coded with the old cipher key. After this the radio network controller 1 resumes the transmission of other data, if available.

In order that a cipher change with a new cipher key known to a terminal and radio network controller is still possible, the RLC layer is to inform a management layer responsible for the data exchange procedure and not further described here that another new cipher is to be announced to the terminal.

After receiving this match command KOK2, which was coded with the new cipher key, the terminal starts the data transmission (uplink) with the new cipher key (RT22). This terminates the procedure CKC2 and thus the data transmission is effected with only this key.

After receiving this match command KOK2, which was coded with the old cipher key, the terminal resumes the data transmission (uplink) with the old cipher key (RT22) and the simultaneous reception with the new cipher key is terminated. This breaks off the change CKC2 and also stops it.

Since the terminal deciphers both with the old and new cipher keys data received between CR12 and RT22, the terminal can recognize whether the change CKC2 was terminated successfully (then the terminal receives the match command KOK2 coded with the new cipher key and the deciphering with the new cipher key yields that KOK2 became suitable, whereas the deciphering with the old cipher key does not yield any useful content) or whether the procedure after the exchange of a new cipher key is to be started again (then the terminal receives the match command KOK2 coded with the old cipher key: here the deciphering with the new cipher key does not yield any useful content, whereas the deciphering with the old cipher key yields that KOK2 became suitable). This avoids that all the connections between terminal and network are cut off in case the terminal has received a false cipher key.

The described change CKC2 first relates only to the signaling link. Data links, which also work with transmission repetitions, are included in the change in that their respective layers RLC are also informed of a stop command (terminal: ST22, network ST12) or a command to resume the transmission of payload data (terminal: RT22, network: RT12/CR22).

Figure 6:
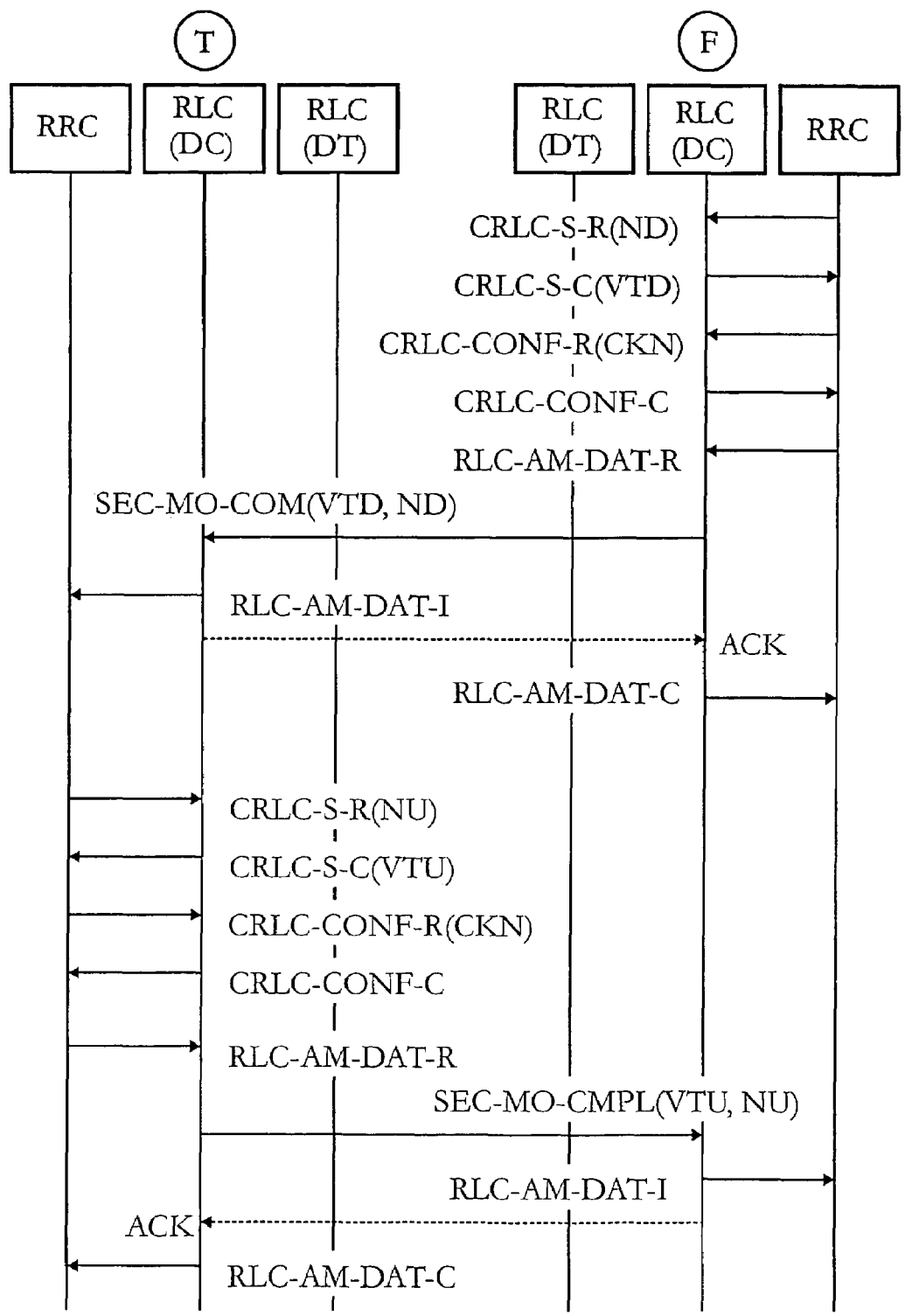

The third cipher key change CKC3 will be explained with reference to FIGS. 6 to 8 in which messages are transmitted between the layers RLC and RRC. In the layer RLC are further exchanged the messages between own instances RLC(DC) and RLC(DT). The instance RLC(DT) is for the control of dedicated traffic channels (DTCH) and the instance RLC(DC) for the control of dedicated control channels (DCCH).

With the cipher key change CKC3, the radio network controller 1 informs the terminals 2 to 9 of the validity of a new cipher key. This new cipher key is known both to the radio network controller 1 and to the terminals 2 to 9. The FIGS. 6 to 8 show various messages which are sent between the layers RRC and RLC of a terminal (on the left in FIGS. 6 to 8 referred to as "T") and the radio network controller 1 (on the right of FIGS. 6 to 8 referred to as "F"). The FIG. 6 to be described hereinafter represents a prolog of the cipher key change CKC3. This cipher key change CKC3 is initiated by the local message CRLC-S-R(ND) by the layer RRC of the side F. With this local message the instance RLC(DC) is informed that the transmission of data units in messages is to be stopped in so far a serial number SN of a data unit (each data unit is marked by a serial number) satisfies the condition $SN \geqq VTD+ND$. The parameter ND of the local message CRLC-S-R(ND) then denotes a number of data units still to be transmitted, and VTD is the serial number of the next data unit to be transmitted known in RLC(DC). By means of the local message CRLC-S-C(VTD) the instance RLC(DC) of the side F acknowledges the reception of the serial number ND and makes the number VTD known to the layer. Subsequently, the layer RRC of the side F informs the instance RLC(DC) of the new cipher key to be used CKN via the local message CRLC-CONF-R(CKN). This message is acknowledged by RLC(DC) of the side F via the local message CRLC-CONF-C.

After the layer RRC of the instance RLC(DC) has delivered the local message RLC-AM-DAT-R, the instance RLC(DC) of the side F sends the message SEC-MO-COM(VTD, ND) to the instance RLC(DC) of the side T (terminal). This message represents a security mode command and is coded with the old thus far valid cipher key. The message contains a data unit with the numbers VTD and ND. After receiving this message, the instance RLC(DC) of the layer RRC of the side T shows via the local message RLC-AM-DAT-I that the message with the indication from when on the new cipher key is to be valid has arrived. This new cipher key holds for the deciphering, that is after the serial number VTD+ND of a data unit. The reception of the message SEC-MO-COM(VTD,ND) at the instance RLC(DC) of the side T is acknowledged via a command ACK from the instance RLC(DC) of the side F and, furthermore, from the layer RRC via the local message RLC-AM-DAT-C. Thus the radio network controller 1 is informed of the fact that the terminal is informed of the beginning of the cipher key change and uses the new cipher key for deciphering data units whose serial number SN satisfies the condition SN≧VTD+ND.

Starting from the side T (terminal), a similar exchange of messages is effected between the layers concerned. A local message CRLC-S-R(NU) from the layer RRC of the side T starts the exchange of messages coming from the side T. With this message the transmission of data units whose serial number SN satisfies the condition SN≧VTU+NU is stopped. The instance RLC(DC) is informed of the number NU of data units still to be transmitted. By means of the local message CRLC-S-C(VTU), the instance RLC(DC) of the side T acknowledges the reception of the number NU and indicates the number VTU to the layer. This number VTU indicates the serial number SN of the data unit which, after reception of the local message CRLC-S-C(VTU) is sent for the first time (in the uplink) (thus no repeated transmission). Subsequently, the layer RRC of the side T informs the instance RLC(DC) of a desire to change the key via the local message CRLC-CONF-R(CKN). This message is acknowledged by RLC(DC) of the side T via the local message CRLC-CONF-C.

Via the local message RLC-AM-DAT-R from the layer RRC of the side T to the instance RLC(DC), the cipher key change part is started which indicates from when on the new cipher key holds for the side T. After the local message RLC-AM-DAT-R has been received, the instance RLC(DC) of the side T (terminal) sends the message SEC-MO-CMPL(VTU,NU) to the instance RLC(DC) of the side F (radio network controller). This message represents a security mode command and is coded with the old thus far valid cipher key. The message contains a data unit having the numbers VTU and NU. After receiving this message, the instance RLC(DC) of the layer RRC of the side F shows via the local message RLC-AM-DAT-I that the message has arrived from when on the new cipher key is to be valid for deciphering in the radio network controller 1. This new cipher key is valid after the serial number VTU+NU of a data unit. The reception of the message SEC-MO-CMPL(VTU,NU) at the instance RLC(DC) of the side F is acknowledged via a command ACK of the instance RLC(DC) of the side F and further to the layer RRC via the local message RLC-AM-DAT-C. Thus it is known to the terminal that the radio network controller 1 knows, that the terminal uses the new cipher key for coding data units of its own messages starting from the serial number VTU+NU.

Figure 7:
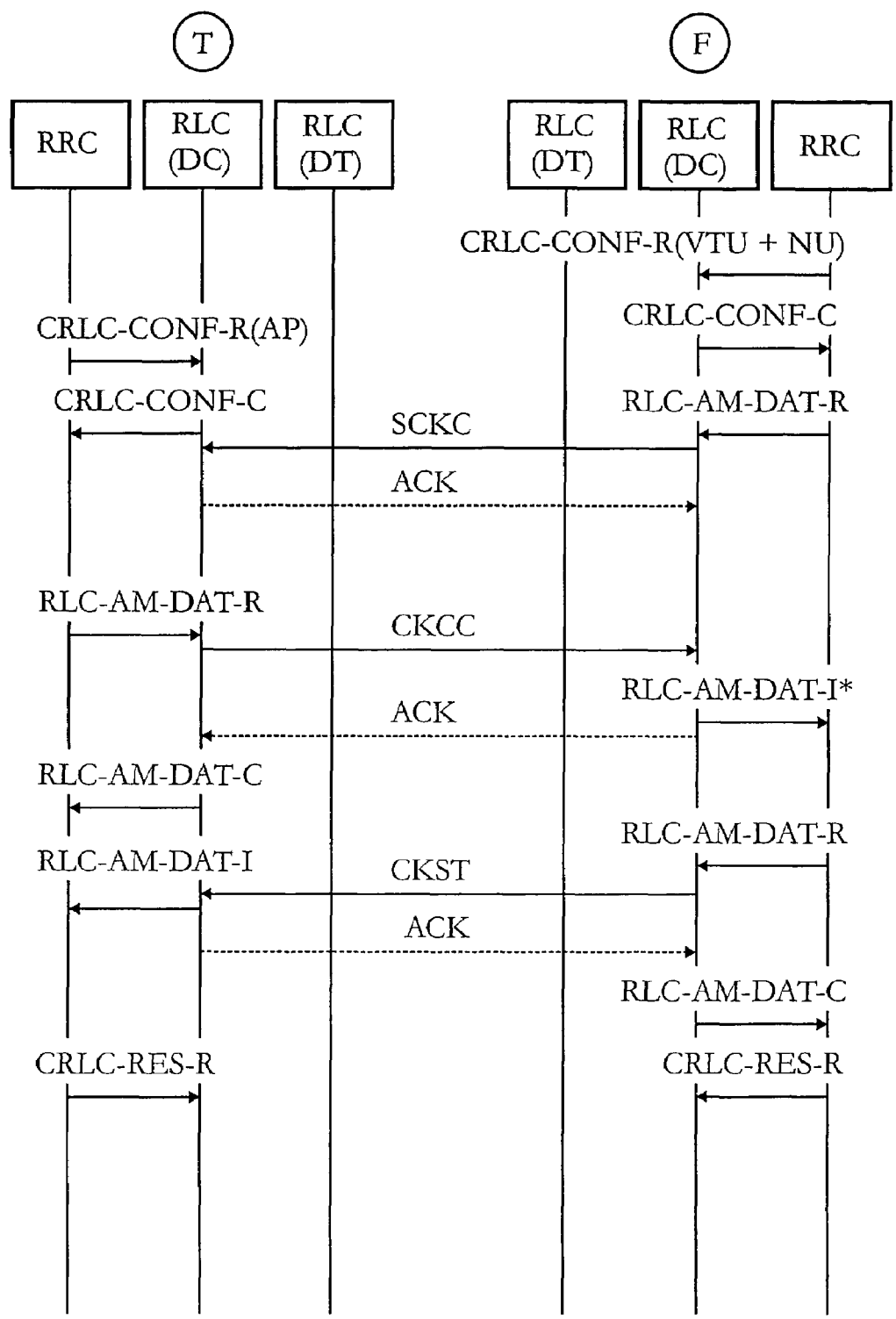
Figure 8:
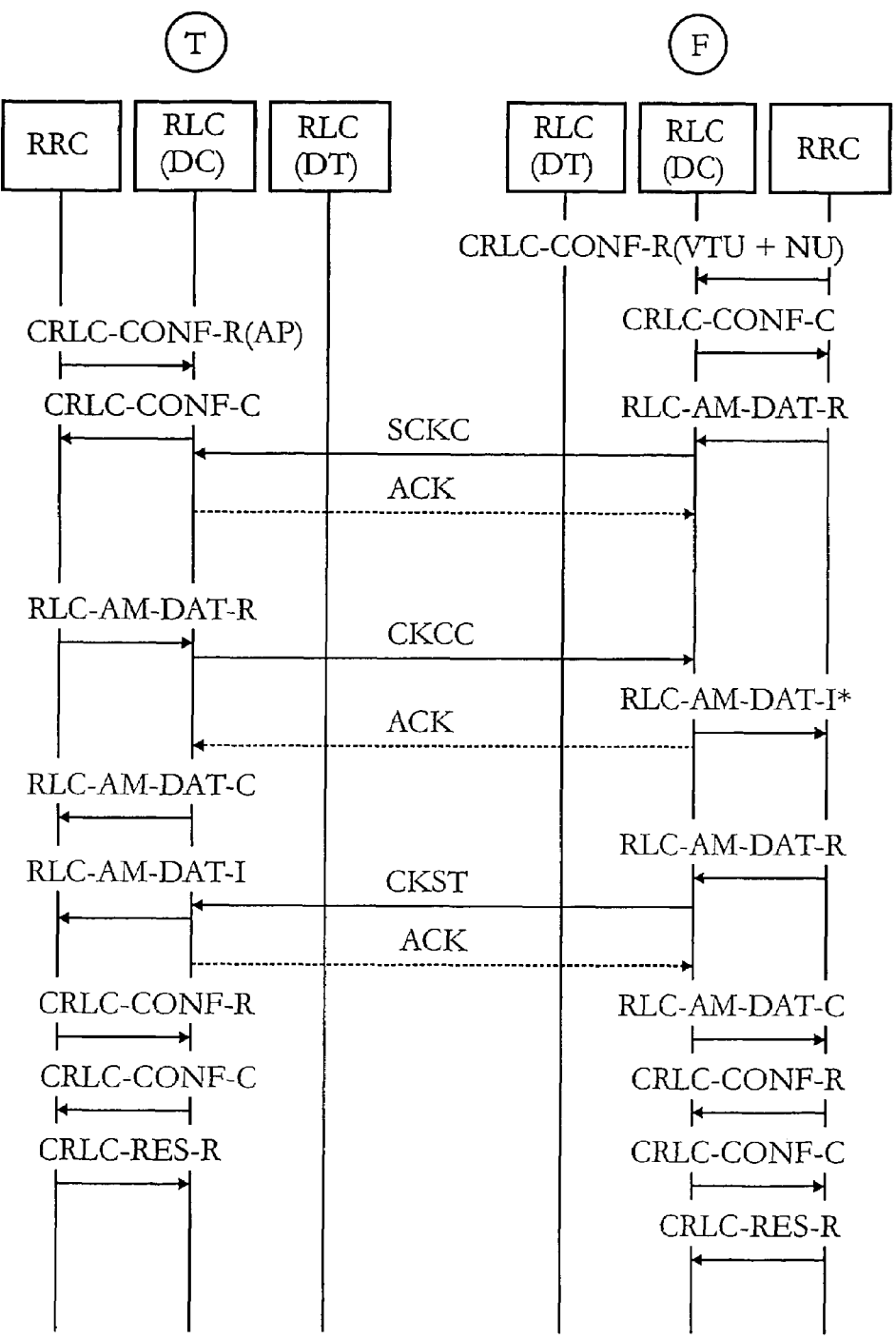

FIG. 7 shows a further part of the procedure following the prolog, which part is denoted as the first test part. During this part are correctly coded and recognized in messages from the two sides T and F data units coded with the new cipher key. The first test part starts with the local message CRLC-CONF-R(VTU+NU) which is transferred on the side F from the layer RRC to the instance RLC(DC). Thus the instance RLC(DC) is informed of the fact that all the messages received from the terminal are to be deciphered with the new cipher key when for the serial number SN of the next data unit the condition SN≧VTU+NU or SN=VR holds where VR represents the next expected data unit to be sent first. The instance RLC(DC) acknowledges the reception of the local message CRLC-CONF-R(VTU+NU) by sending the local message CRLC-CONF-C to the layer RRC. On the side T the instance RLC(DC) is informed by transferring of the local message CRLC-CONF-R(AP) from the layer RRC to the instance RLC(DC) that after this message the following data units to be transmitted on side F (radio network controller 1) are coded with the new cipher key. Received messages of the side F, however, are still to be deciphered with the old cipher key. The instance RLC(DC) acknowledges to the layer RRC on the side T the reception of the local message CRLC-CONF-R(AP) by means of the local message CRLC-CONF-C.

With the following message routine is checked whether the two sides T and F use the same new cipher key. This message routine is started by the layer RRC of the side F with the local message RLC-AM-DAT-R to the instance RLC(DC). With this message the instance RLC(DC) of the side F is requested to send a message SCKC coded with the old cipher key to the instance RLC(DC) of the side T. After receiving this message SCKC, the instance RLC(DC) of the side T sends an acknowledgement of reception ACK to the instance RLC(DC) of the side F. The layer RRC of the side T sends a message N(CKCC) in the local message RLC-AM-DAT-R to the instance RLC(DC) of the side T, which message is broken up into a plurality of data units by the instance RLC(DC) of the side T. The instance RLC(DC) of the side T codes these data units with the new cipher key and sends them (message CKCC in FIG. 7) to the instance RLC(DC) of the side F. The instance RLC(DC) of the side F deciphers all the received data units of the message CKCC with the new cipher key, builds the message N(CKCC) from the data units sent in the message CKCC and transfers this message N(CKCC) in the local message RLC-AM-DAT-I* to the layer RRC of the side F. The local message RLC-AM-DAT-I* is only used for the message N(CKCC) whose first data unit, after reception of the local message CRLC-CONF-R(VTU+NU), had the serial number SN=VR (this is exactly the message CKCC). As a result, the layer RRC of the side F knows that it takes the message N(CKCC) from the instance RLC(DC).

If on the side T the correct new cipher key is used, the layer RRC of the side F receives the expected message N(CKCC) in the local message RLC-AM-DAT-I*. If a false new cipher key is used on the side T, the layer RRC of the side F receives a useless or unknown message in the local message RLC-AM-DAT-I*. The layer RRC of the side F infers therefrom that the side T has used a false key i.e. the unknown message is not ignored in this specific case.

After receiving the message CKCC, the instance RLC(DC) of the side F acknowledges to the instance RLC(DC) of the side T the reception of the message CKCC via the command ACK. The reception is transferred by the instance RLC(DC) of the side T to the layer RRC via the local message RLC-AM-DAT-C.

After receiving the communication contained in the message RLC-AM-DAT-I*, the layer RRC of the side F sends the communication N(CKST), which contains an indication about whether the side T has used the correct or the false new cipher key (CKST=cipher key status) to the layer RRC of T. This in turn happens because the layer RRC of the side F gives this communication N(CKST) in the local message RLC-AM-DAT-R to the instance RLC(DC) of the side F, which divides this communication into a plurality of data units and, coded with the old cipher key, sends it to the instance RLC(DC) of the side T via the message CKST. The instance RLC(DC) of the side T acknowledges the reception of these data units via the message ACK, deciphers them with the old cipher key and rebuilds the communication again N(CKST). This communication N(CKST) is delivered to the layer RRC of the side T in a local message RLC-AM-DAT-I.

If on the side T the correct new cipher key is used, the layer RRC of the side F instructs the instance RLC(DC) via the local message CRLC-RES-R to restart the transmission of the data units while utilizing the new cipher key. The deciphering on the side F is effected with the new cipher key when for the serial numbers of the received data unit it holds that $SN \geq VTU+NU$.

If the message CKST contains the acknowledgement that the new cipher key used by the side T is correct, the layer RRC of the side T instructs its instance RLC(DC) via the local message CRLC-RES-R to start transmitting the data units again while using the new cipher key. The deciphering on the side T is effected with the new cipher key when for the serial numbers SN of the received data unit the following holds $SN \geq VTD+ND$ (FIG. 7).

If on the side T a false new cipher key is used (compare FIG. 8 which shows the first check part for a false key), the layer RRC of the side F instructs the instance RLC(DC) of the side F via the local message CRLC-CONF-R that the conversion to the new cipher key for the deciphering is canceled when the condition $SN \geq VTU+NU$ is satisfied. For coding data units of which the transmission is stopped, again the old cipher key is used. The local message CRLC-CONF-R is acknowledged via the local message CRLC-CONF-C by the instance RLC(DC). By means of a local message CRLC-RES-R the layer RRC of the side F informs the instance RLC(DC) to resume the transmission of data units (with the old cipher key).

If the message CKST contains the indication that the new cipher key used by the side T is not the correct one, the layer RRC of the side T instructs the instance RLC(DC) via a local message CRLC-CONF-R, which is acknowledged by means of a message CRLC-CONF-C, that the conversion to the new cipher key is canceled for the deciphering when the condition $SN \geq VTD+ND$ is satisfied. For the coding of data units whose transmission is still stopped, also the old cipher key is used. By means of a local message CRLC-RES-R the layer RRC of the side F tells the instance RLC(DC) to resume the transmission of data units (with the old cipher key).

Figure 9:
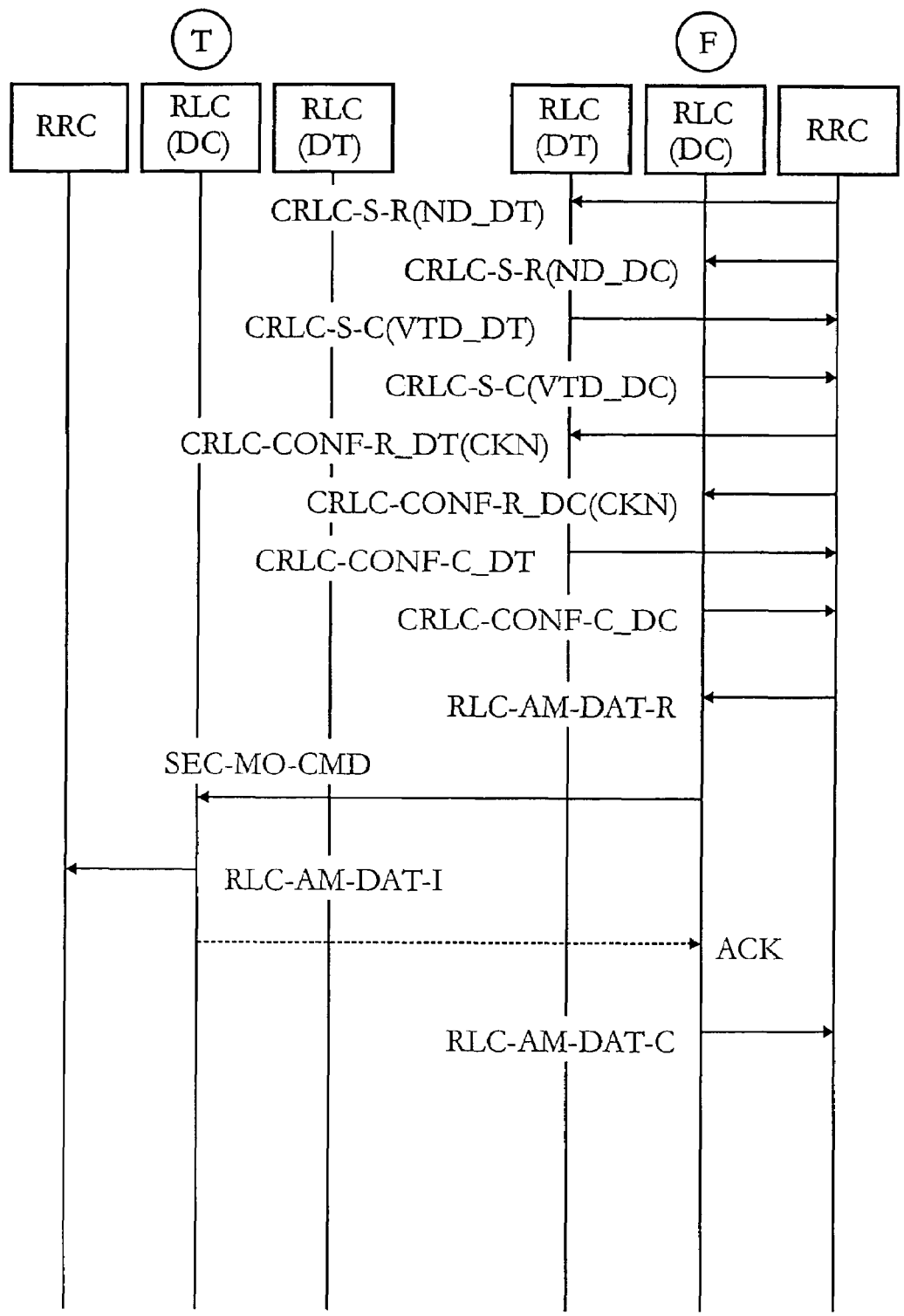
Figure 10:
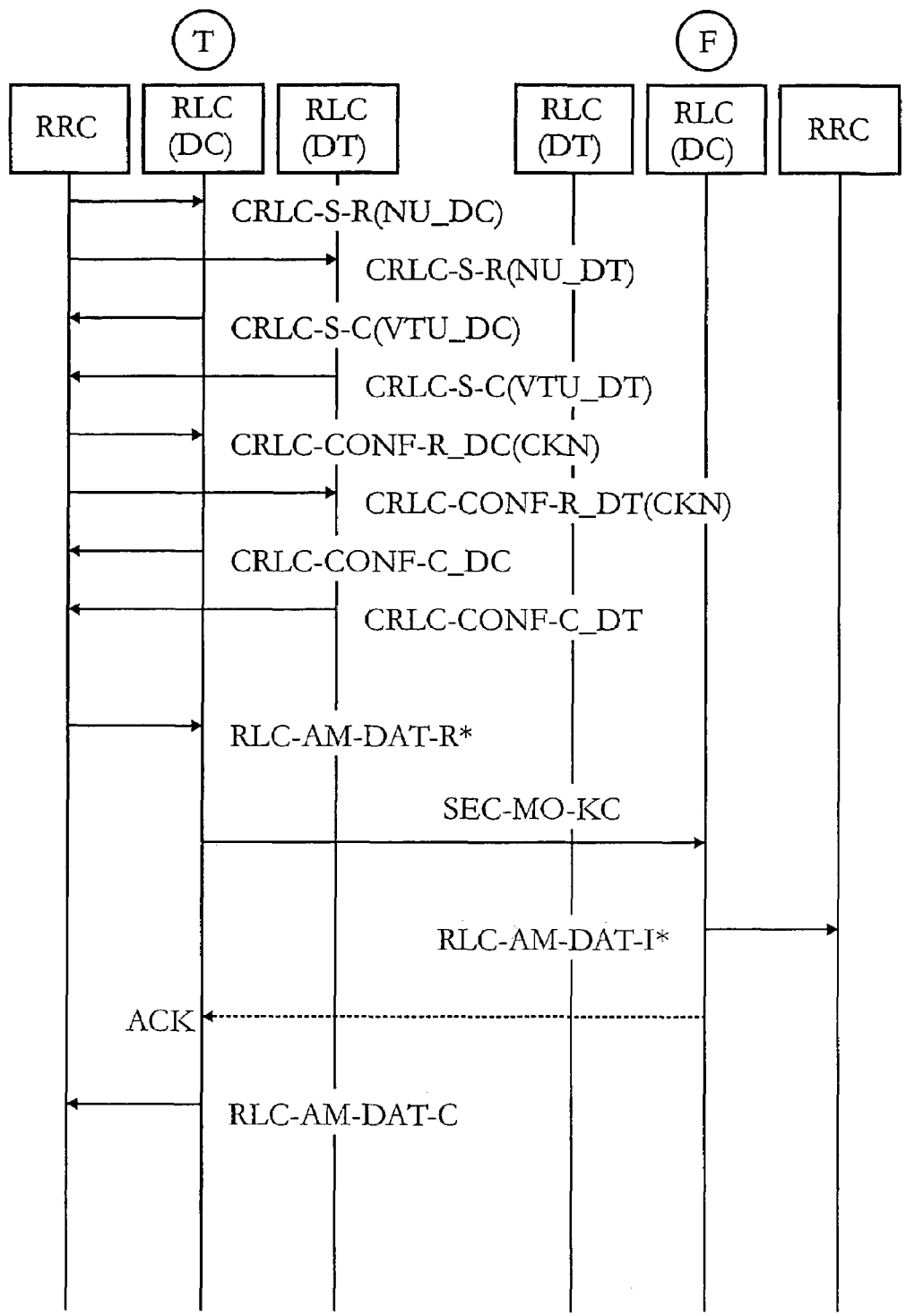

The fourth cipher key change procedure CKC4 will be explained with the aid of FIGS. 9 to 12. FIGS. 9 and 10 describe the cipher key change procedure CKC4 for the case where the terminal uses the correct new cipher key or the terminal uses a false new cipher key respectively. Since prior to the eventual conversion to coding and deciphering with the new cipher key, first a check is made whether the terminal uses the right new cipher key, in the case of error the coding and deciphering can be resumed with the old cipher key, without all the connections between the sides T and F (free of data loss) being terminated. In the following procedure to be described hereinafter, a single dedicated traffic channel will be considered in addition to the signaling link (DC). In a general way, a plurality of dedicated traffic channels and further dedicated control channels (which are not used for the signaling purposes of the procedure CKC) are possible for which the procedure can be extended accordingly.

The cipher key change procedure CKC4 (FIG. 9) is started via the local messages CRLC-S-R(ND_DC) or CRLC-S-R(ND_DT) respectively from the layer RRC of the side F to the instances RLC(DC) or RLC(DT) respectively. Via the message CRLC-S-R(ND_DC) or CRLC-S-R (ND_DT) respectively, the instance RLC(DC) or RLC(DT) respectively is informed of the fact that the transmission of data units is to be stopped in so far the serial number of a data unit (each data unit is marked by a serial number) satisfies the condition $SN \geq VTD\_DC+ND\_DC$ or $SN \geq VTD\_DT+ND\_DT$. Then the parameter ND_DC or ND_DT of the local message CRLC-S-R(ND_DC) or CRLC-S-R(ND_DT) respectively, stands for a number of data units still to be transmitted, and VTD_DC or VTD_DT respectively, is the serial number SN known in RLC(DC) or RLC(DT) respectively of the next data unit to be transmitted first. For the control channel DC can be selected ND_DC to be at least so large that all the data units of the following downlink messages SEC-MO-CND and SEC-MO-KC (FIGS. 9 and 10) can still be sent before the transmission is stopped. For the traffic channel ND_DT can be set to zero.

By means of the local message CRLC-S-C(VTD_DC) or CRLC-S-C(VTD_DT) respectively, the instance RLC(DC) or RLC(DT) respectively, of the side F acknowledges the receipt of number ND_DC or ND_DT and makes the number VTD_DC or VTD_DT respectively, known to the layer. Subsequently, the layer RRC of the side F informs the instance RLC(DC) or RLC(DT) respectively, via the message CRLC-CONF-R_DC(CKN) or CRLC-CONF-R_DT (CKN) respectively, of the new cipher key CKN to be used. This message is acknowledged by RLC(DC) or RLC(DT) respectively of the side F via the local message CRLC-CONF-C_DT or CRLC-CONF-C_DC respectively.

The instance RLC(DC) of the side F sends the communication SEC-MO-CND contained in the local message RLC-DAT-R received from the layer RRC to the instance RLC(DC) of the side T (terminal). This communication represents a security mode command and is coded with the old thus far valid key. The communication, which may consist of one or more data units, contains the numbers VTD_DC, ND_DC, VTD_DT and VTD_DT.

After receiving this communication, the instance RLC (DC) of the layer RRC of the side T indicates via the local message RLC-AM-DAT-I that this communication has arrived having the indication from when on the new cipher key is to be valid. This new cipher key is valid on the control channel DC for deciphering from the serial number VTD_DC+ND_DC of a data unit onwards and on the traffic channel from the serial number VTD_DT+ND_DT onwards. The reception of the communication SEC-MO-CMD at the instance RLC(DC) of the side T is acknowledged via a reception acknowledgement ACK of the instance RLC(DC) of the side F and further acknowledged to the layer RRC via the local message RLC-AM-DAT-C. Thus, it is known to the radio network controller 1 that the terminal is informed of the beginning of the cipher key change procedure and uses the new cipher key for deciphering data units, whose serial number SN satisfies the condition SN≧VTD_DC+ND_DC in the case of the control channel and SN≧VTD_DT+ND_DT in the case of a traffic channel.

By means of the above-mentioned local messages CRLC-CONF-R_DC(CKN) or CRLC-CONF-R_DT(CKN) respectively, now the layer RRC of the side F instructs the instance RLC(DC) or RLC(DT) respectively to code all new i.e. not sent as a repetition, expected data units (until the next communication has been completed) with the new cipher key. They are the data units for whose serial number SN the condition SN≧VR is satisfied on reception of the above-mentioned local message CRLC-CONF-R_DC(CKN) and CRLC-CONF-R_DT(CKN), where VR is the variable kept at the instance RLC(DC) which stands for the serial number of the next expected data unit not sent as a repetition.

Starting from the side T (terminal) (FIG. 10), a similar exchange of messages between the respective layers is effected. A local message CRLC-S-R(NU_DC) to the instance RLC(DC) or CRLC-S-R(NU_DT) to the instance RLC(DT) respectively, from the layer RRC of the side T starts the exchange of messages coming from side T. With these two local messages the transmission of data units is stopped whose number satisfies the condition SN≧VTU_DC+NU_DC (for the control channel) and SN≧VTU_DT+NU_DT (for the traffic channel), and the number NU_DC or NU_DT of data units still to be transmitted is informed to the instance RLC(DC) or RLC(DT), respectively. For the control channel DC, NU_DC is to be selected (at least) so large that all the data units of the following uplink communications SEC-MO-KC (FIG. 10) and SEC-MO-CMPL respectively (FIGS. 11 and 12) can still be sent before the transmission is stopped. For the traffic channel NU_DT may also be set to zero.

By means of the local message CRLC-S-C(VTU_DC) or CRLC-S-C(VTU_DT) the instance RLC(DC) or RLC(DT) respectively, of the side T acknowledges the reception of the number NU_DC or NU_DT respectively, and indicates to the layer the number VTU_DC or VTU_DT respectively. This number VTU_DC or VTU_DT respectively indicates the serial number SN of the data unit which is sent for the first time over the control channel or traffic channel in the uplink (thus no repeated transmission) after reception of the local message CRLC-S-C(VTU_DC) or CRLC-S-C (VTU_DT). Subsequently, the layer RRC of the side T informs the instances RLC(DC) or RLC(DT) respectively via the local message CRLC-CONF-R_DC(CKN) or CRLC-CONF-R_DT(CKN) respectively of a desire to change the cipher key. By means of the numbers VTD_DC+ND_DC, VTD_DT+ND_DT is furthermore announced the serial number of data units from which onwards deciphering is to be effected with the new cipher key. This local message is acknowledged by RLC(DC) and RLC(DT) of the side T each with a local message CRLC-CONF-C_DC or CRLC-CONF-C_DC.

By means of the local message RLC-AM-DAT-R* of the layer RRC of the side T to the instance RLC(DC), the procedure part starts by which the side F can check whether the side T utilizes the right new cipher key. After receiving the local message RLC-AM-DAT-R*, the instance RLC(DC) of the side T (terminal) sends the communication SEC-MO-KC to the instance RLC(DC) of the side F (radio network controller 1), coded with the new cipher key. The upper case asterisk ("*") means that (for example, by means of an additional parameter (flag) in the local message RLC-AM-DAT-R) the RLC(DC) is shown that for this specific communication the new cipher key is to be used for coding.

The serial numbers of the data units of this message at the instance RLC(DC) of the side F satisfy the condition SN≧VR, so that they are deciphered with the new cipher key. The message reconstructed from the data units deciphered with the new cipher key is now given with the local message RLC-AM-DAT-I* to the layer RRC of the side F, while the upper case asterisk ("*") means that (for example, by an additional parameter (flag) in the local message RLC-AM-DAT-I) the layer RRC is shown that the communication transmitted as a parameter was a combination of data units which were deciphered with the new cipher key. For a reliable check of the correct key it may be necessary for the communication SEC-MO-KC to consist of a plurality of data units.

The layer RRC of the side F expects at this instant exactly the communication SEC-MO-KC. If on the side T the correct new cipher key is used for coding, the layer RRC recognizes this communication in the parameter of the local message RLC-AM-DAT-I* and the procedure takes effect in the way described in FIGS. 10 and 11.

Figure 12:
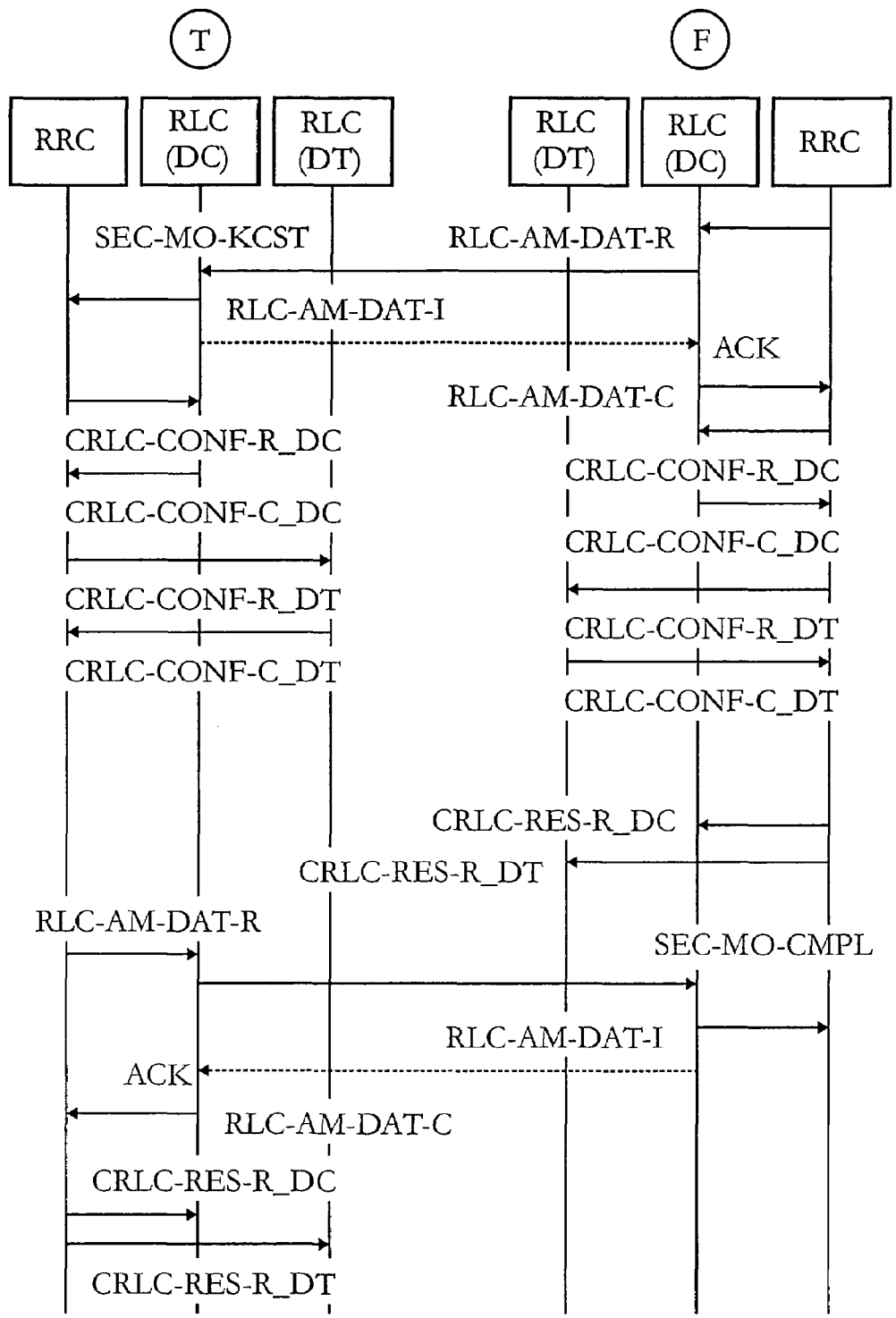

If on the side T a false new cipher key is used for coding, the layer RRC recognizes no useful or known communication in the parameter of the local message RLC-AM-DAT-I*. In this specific case, in which an unknown communication was received with the local message RLC-AM-DAT-I* by the layer RRC, the layer RRC does not simply reject this unknown communication, but concludes that the side T utilizes a wrong new cipher key. The procedure is continued in this case as represented in FIG. 12.

In both cases the layer RRC of the side F sends (as a parameter of the local message RLC-AM-DAT-R to the instance RLC(DC)) on the side T the communication SEC-MO-KCST, which contains an indication whether the layer RRC of the side F has established whether the side T utilizes the correct new cipher key or a falsified one. The data units of the communication SEC-MO-KCST are always coded with the old cipher key.

Figure 11:
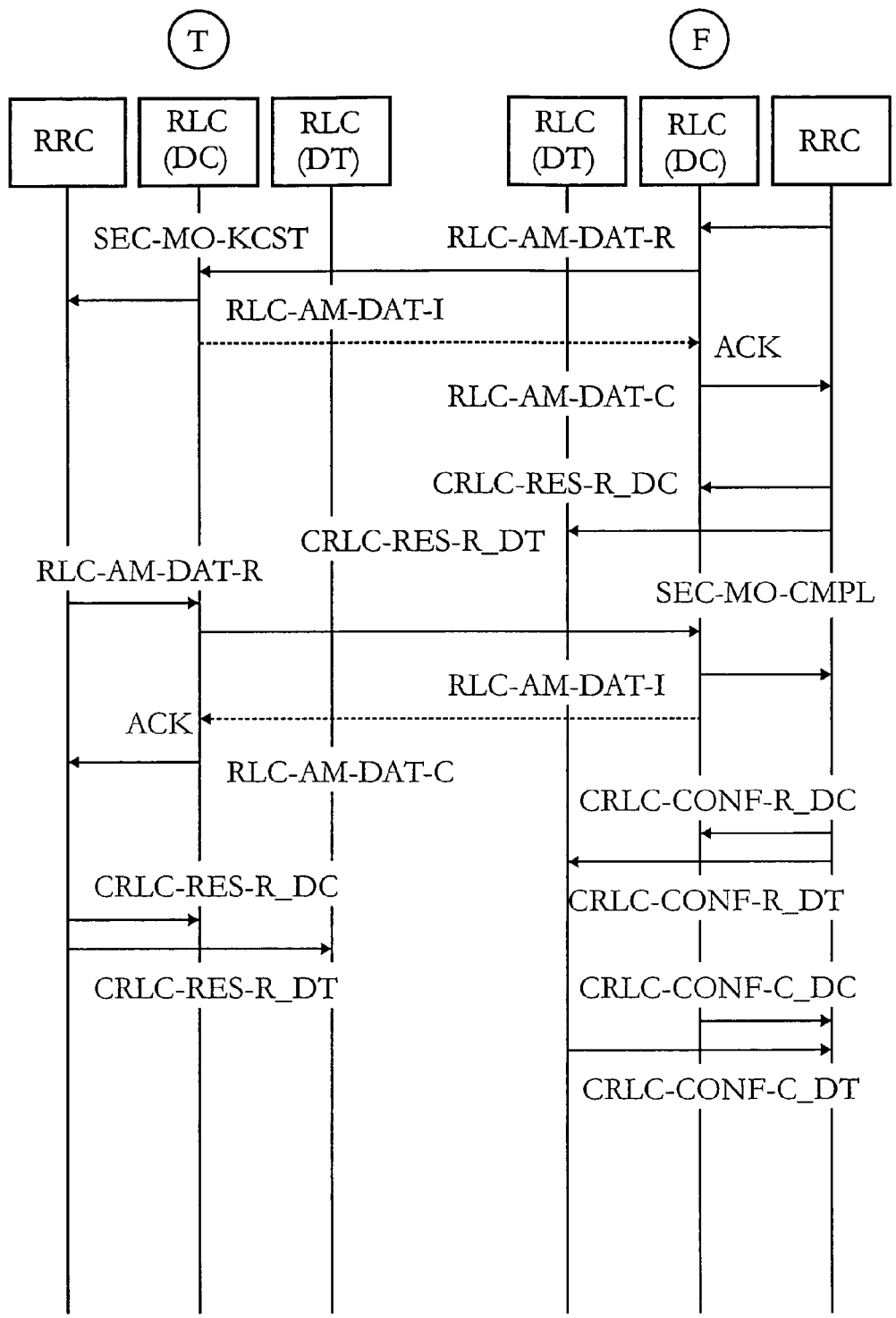

In the following is described the normal case shown in FIG. 11. After receiving the local message RLC-AM-DAT-C, which transfers the acknowledgement of receipt ACK by RLC(DC) of the side T for the reception of the communication SEC-MO-KCST of the side F to the layer RLC(DC) of the side F, the layer RRC of the side F instructs the instances RLC(DC) and RLC(DT) via the local message CRLC-RES-R_DC or CRLC-RES-R_DT, to resume the so far stopped transmissions of data units whose serial numbers SN in RLC(DC) satisfy the condition SN≧VTD_DC+ND_DC or in RLC(DT) the condition SN≧VTD_DT+ND_DT. These data units are coded with the new cipher key.

In the following is described the case of an error shown in FIG. 12. After receiving the local message RLC-AM-DAT-C, which transfers the acknowledgement of receipt ACK of RLC(DC) of the side T for the reception of the communication SEC-MO-KCST of the side F to the layer RRC, the layer RRC of the side F instructs after further messages described hereinafter the instances RLC(DC) and RLC(DT), first by means of the local messages CRLC-CONF-R_DC or CRLC-CONF-R_DT respectively, acknowledged by CRLC-CONF-C_DC or CRLC-CONF-C_DT, to cancel the conversion to the new cipher key and, subsequently, by means of the local messages CRLC-RES-R_DC or CRLC-RES-R_DT to resume the so far stopped transmissions of data units whose serial numbers SN in RLC(DC) satisfy the condition SN≧VTD_DC+ND_DC or in RLC(DT) the condition $SN \geq VTD\_DT+ND\_DT$. These data units are coded with the old cipher key.

As a result of the acknowledgement of receipt ACK, the reception of the communication SEC-MO-KC on the side F is acknowledged to the T (FIG. 10). The local message RLC-AM-DAT-C transfers this acknowledgement to the layer RRC on the side T. After receiving this acknowledgement, the side T expects the communication SEC-MO-KCST from the side F (FIGS. 11 and 12). When receiving the communication SEC-MO-KCST at the instance RLC (DC), whose reception is acknowledged to the side F via the communication ACK, this instance of the side T hands over the communication SEC-MO-KCST as a parameter of the local message RLC-AM-DAT-I to the layer RRC of the side T.

When, in the normal case (in FIG. 11) the communication SEC-MO-KCST of the side T shows that the new cipher key used is the right one, the side T sends the communication SEC-MO-CMPL to the side F. After receiving the local message RLC-AM-DAT-R (FIG. 11), the instance RLC(DC) of the side T (terminal) sends the communication SEC-MO-CMPL to the instance RLC(DC) of the side F (the radio network controller). This communication represents a security mode command (security mode complete) and is coded with the old key valid so far. The message consists of one or more data units and transfers the numbers VTU_DC, NU_DC, VTU_DT and NU_DT. After receiving this communication, the instance RLC(DC) of the layer RRC of the side F shows via the local message RLC-AM-DAT-I that this communication has arrived with the indication from when on the new cipher key is to be valid for deciphering in the radio network controller. This new cipher key stands for data units whose serial number SN satisfies the condition $SN \geq VTU\_DC+NU\_DC$ (control channel) or $SN \geq VTU\_DT+NU\_DT$ (traffic channel).

After receiving the communication SEC-MO-CMPL, the layer RRC of F instructs its instances RLC(DC) and RLC (DT) by means of the local messages CRLC-CONF-R_DC or CRLC-CONF-R_DT to utilize the new cipher key for deciphering all the data units whose serial numbers SN satisfy the condition $SN \geq VTU\_DC+NU\_DC$ at the instance RLC(DC) or the condition $SN \geq VTU\_DT+NU\_DT$ at the instance RLC(DT). This ends the cipher key change on the side F in normal cases.

The reception of the communication SEC-MO-CMPL at the instance RLC(DC) of the side F is acknowledged via the acknowledgement of receipt ACK of the instance RLC(DC) of the side T and, furthermore, their layer RRC via the local message RLC-AM-DAT-C. Thus it is known to the terminal that it is known to the radio network controller 1 that the terminal utilizes the new cipher key for coding data units of its own communications from serial number VTU_DC+ NU_DC onwards on the control channel and VTU_DT+ NU_DT on the traffic channel.

Since the side T uses the correct new cipher key, their layer RRC instructs the instance RLC(DC) or RLC(DT) after receiving the local message RLC-AM-DAT-C via the local messages CRLC-RES-R_DC or CRLC-RES-R_DT (FIG. 11) to resume the thus far stopped transmission of data units whose serial numbers SN satisfy the condition $SN \geq VTU\_DC+NU\_DC$ at the instance RLC(DC) for the control channel or $SN \geq VTU\_DT+NU\_DT$ at the instance RLC(DT) for the traffic channel. These data units are coded with the new cipher key. This normally ends the procedure CKC4 of the side T.

When the communication SEC-MO-KCST of the side T shows that the new cipher key used is false (error) (FIG. 12), the layer RRC instructs the instances RLC(DC) and RLC (DT) by means of the two local messages CRLC-CONF-R_DC and CRLC-CONF-R_DT to cancel the prepared conversion to the new cipher key.

Furthermore, the side T sends the communication SEC-MO-CMPL to the side F to terminate the procedure. This communication is then given as a parameter of the local message RLC-AM-DAT-R to the instance RLC(DC) via the radio interface to the instance RLC(DC) of the side F and by this interface as a parameter of the local message RLC-AM-DAT-I to the layer RRC of the side F. Since the use of the new cipher key is not followed by a switch-over, the message SEC-MO-CMPL does not need to contain the numbers VTU_DC, NU_DC, VTU_DT and NU_DT. The data units of the communication SEC-MO-CMPL are also coded with the old cipher key.

Since for the deciphering no change has occurred at the instance RLC(DC) or RLC(DT) of the side F, no reconfiguration of these instances for the deciphering is necessary either, so that the cipher key change CKC ends with the reception of the communication SEC-MO-CMPL in the case of an error on side F.

After the acknowledgement of receipt ACK for the communication SEC-MO-CMPL of the layer RLC(DC) of the side T, it is transferred to the layer RRC of the side T via the local message RLC-AM-DAT-C. The layer RRC of the side T then instructs the instances RLC(DC) and RLC(DT) by means of the two local messages CRLC-RES-C_DC or CRLC-RES-C_DT to resume the thus far stopped transmission of data units whose serial numbers SN satisfy the condition $SN \geq VTU\_DC+NU\_DC$ at the instance RLC(DC) for the control channel or $SN \geq VTU\_DT+NU\_DT$ at the instance RLC(DT) for the traffic channel.

These data units are coded with the old cipher key due to the change-over to the new cipher key canceled previously via the two local messages CRLC-CONF-R_DC at the instance RLC(DC) and CRLC-CONF-R_DT at the instance RLC(DT). In case of the error, the cipher key change CKC on side T ends.

Figure 13:
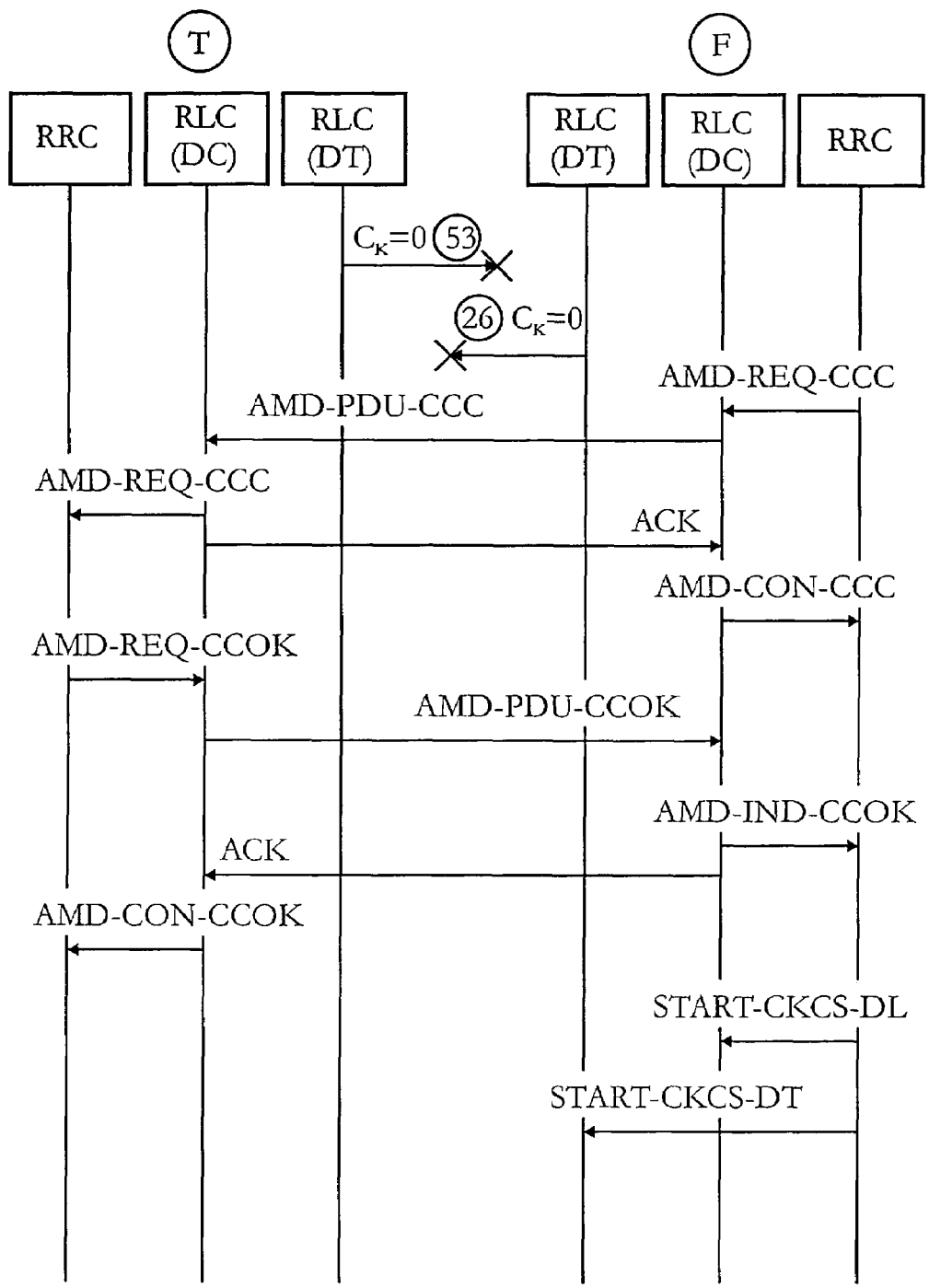

The fifth cipher key change CKC5 will be described with reference to FIGS. 13 and 14. As explained earlier, local messages between the layers RLC and RRC are transmitted during this procedure. The layer RLC has two instances RLC(DC) and RLC(DT) available. The instance RLC(DT) is capable of controlling dedicated traffic channels (DTCH) and the instance RLC(DC) to control dedicated control channels (DCCH). The terminal receives the information about the new cipher key in a separate authentication procedure between terminal and radio network controller as described for example in GSM (compare "GSM Global System for Mobile communications" by J. Eberspächer and H. J. Vogel, Teubner Stuttgart 1997, pp. 146 to 154). It is avoided in this publication that the key itself is transmitted via the radio interface.

With the procedure to be described CKC5, a synchronized conversion from the old to the new cipher key between terminal and radio network controller is carried out. The procedure CKC5 starts with a prolog phase which follows a synchronization phase. The FIGS. 13 and 14 show various messages which are sent between the layers RRC and RLC of a terminal (left side of FIGS. 4 and 5 referred to as "T") and of the radio network controller (right-hand side of FIGS. 4 and 5 referred to as "F").

First the radio network controller (compare FIG. 4) informs the terminal of the intended change to the new cipher key. On the side F the layer RRC orders the instance RLC(DC) by means of the local message AMD-REQ-CCC to send a communication AMD-PDU-CCC to the instance RLC(DC) of the side T. This instance informs the instance RLC(DC) of the side F via the acknowledgement of receipt ACK and the layer RRC of the side T via the local message AMD-REQ-CCC of the received communication. On the side F the acknowledgement of receipt ACK is transferred by RLC(DC) to RRC via the local message AMD-CON-CCC.

On the side T the layer RRC orders the instance RLC(DC) via the local message AMD-REQ-CCOK to send a communication AMD-PDU-CCOK to the instance RLC(DC) of the side F. RLC(DC) of the side F informs the instance RLC(DC) of the side T via the acknowledgement of receipt ACK and the layer RRC of the side F via the local message AMD-IND-CCOK via the received communication. On the side T the acknowledgement of receipt ACK is transferred by RLC(DC) to the layer RRC via the local message AMD-CON-CCOK.

The exchange of messages and communications described so far is referred to as a prolog of the procedure CKC5. The communications AMD-PDU-CCC and AMD-PDU-CCOK are coded with the old cipher key. These communications contain a control part with control information which is referred to as RLC header. A special bit $C_K$ of this RLC header indicates whether the new or old cipher key is used. When using this special bit $C_K$ it is possible that a data unit, which has already been transmitted once prior to the procedure CKC5 and whose reception has not yet been acknowledged, can again be transmitted with the old cipher key. Data units are coded with the new cipher key when they are sent for the first time after the prolog. This measure provides that a listener in the case of repetitions of transmissions always hears only identical copies of already received coded data units and receives no new information when he listens in on the channel during the phase of a repetition of transmission.

Before the prolog of the procedure CKC5, the special bit $C_K$ is set to zero. After the prolog the special bit $C_K$ set to one in the next synchronization phase indicates that the data were coded with the new cipher key, whereas the bit $C_K$ set to zero in the synchronization phase means that the data were coded with the old cipher key.

The synchronization phase starts at different times at the terminal and at the radio network controller: in the downlink (DL) the synchronization phase starts with the transmission of the first data unit DL-new-new, after the layer RRC has informed the instances RLC(DC) and RLC(DT) of the layer RLC of the local messages START-CKCS-DL and START-CKCS-DT the beginning of the synchronization phase. A data unit (sent on the downlink) is called DL-new-new when it is transmitted for the first time after the prolog. A data unit DL-new-new becomes a data unit DL-new as soon as a repetition of transmission takes place. A data unit is referred to as DL-old-old if it was transmitted already before the prolog (for the first time or as a repetition). It is referred to as DL-old when it is again transmitted after the prolog.

In the uplink (UL) the synchronization phase starts with the transmission of the first data unit UL-new-new. A data unit sent (on the uplink) is called DL-new-new when it is sent for the first time after the reception of the first data unit DL-new-new or DL-new. This is referred to as data unit UL-new as soon as it is transmitted again. A data unit is called UL-old-old when it is transmitted before the reception of the first data unit DL-new-new or DL-new. It is called data unit UL-old when it is a repeated transmission of a data unit DL-old-old after the reception of the first data unit DL-new-new or DL-new.

The following rules 1 to 5 control the synchronization phase so that the special bit $C_K$ can be set to zero and the respective data unit is transmitted only coded with the new cipher key after both in the uplink and in the downlink all the data units UL-old and DL-old were transmitted either successfully (coded with the old cipher key) or the maximum number of permitted repetitions of transmission was reached for these data units. When the maximum number has been reached, no further efforts are made to transmit these data units.

Rule 1: During the synchronization phase in the downlink, the RLC layer (for example instance RLC(DT)) of the side F sends data units DL-new-new and DL-new coded with the new cipher key. The special bit $C_K$ is set to one. Data units DL-old, on the other hand, are sent coded with the old cipher key while the special bit $C_K$ is set to zero. In FIG. 14 such data unit has the data unit number 26. During the synchronization phase in the uplink, the RLC layer (for example, instance RLC(DT)) sends data units UL-new-new and UL-new coded with the new cipher key while the special bit $C_K$ is set to one. Data units UL-old are sent coded with the old cipher key while the special bit $C_K$ is set to zero.

Rule 2: The RLC layer stores the running data unit numbers SN (sequence number) of the first data unit DL-new-new or DL-new received without any errors. This data unit number forms part of the RLC header and is referred to as $SN_{F\text{-}DL}(T)$ of the side T.

Figure 14:
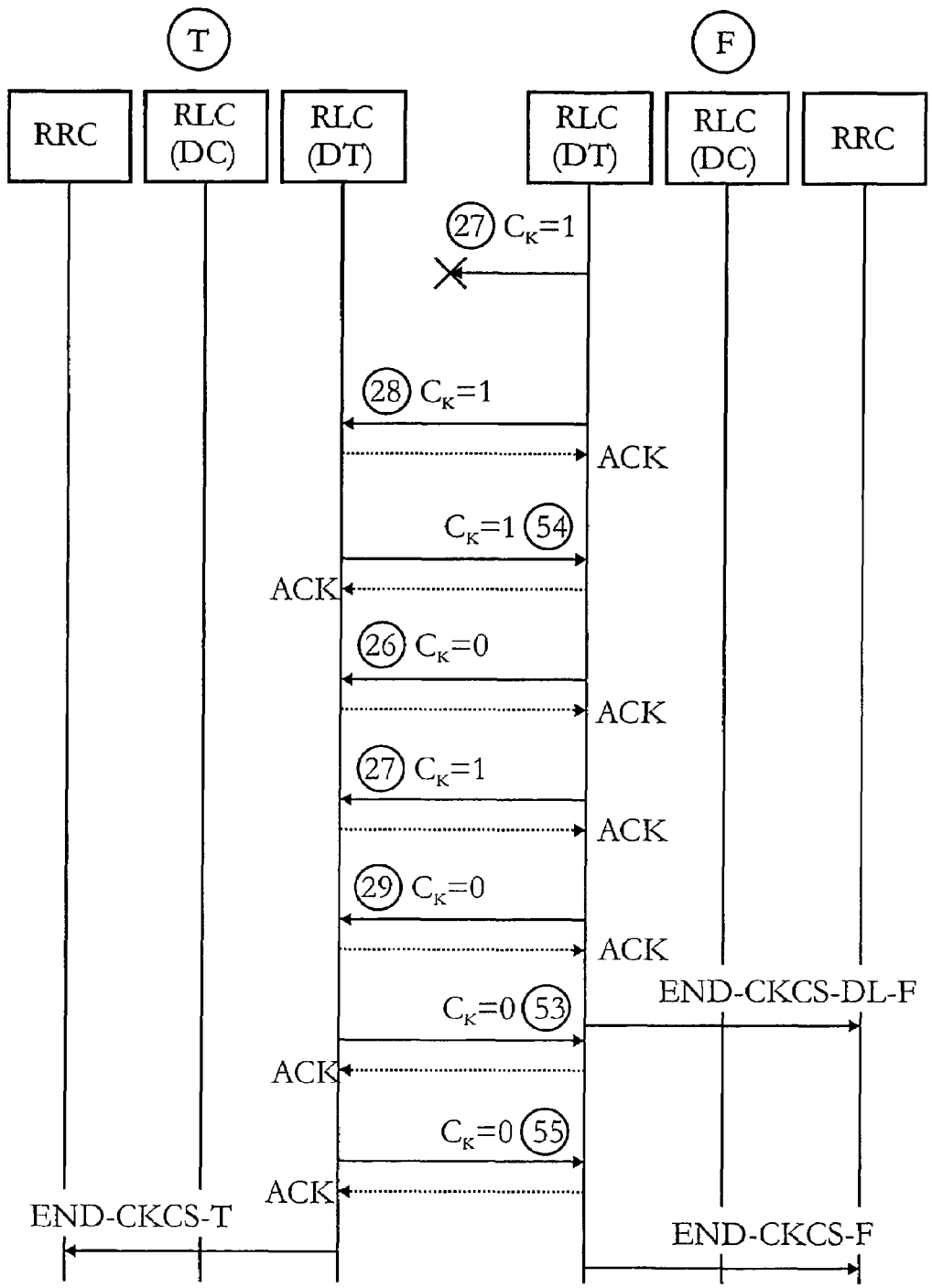

In FIG. 14 $SN_{F\text{-}DL}(T)$ has the data unit number 28. The previously sent data unit DL-new-new with the sequence number 27 (FIG. 14) was not sent without any errors. When the data unit having sequence number 27 is sent again, this data unit becomes DL-new.

The RLC layer of the side F stores the running data unit number of the first-acknowledged data unit DL-new-new or DL-new. This data unit number is referred to as $SN_{F\text{-}DL}(F)$. In FIG. 14 $SN_{F\text{-}DL}(F)$ also has the value 28 and belongs to a data unit DL-new-new.

Rule 3: The RLC layer of the side F stores the running number of the first data unit UL-new-new or UL-new received without any errors. This number is referred to as $SN_{F\text{-}UL}(F)$. In FIG. 14 it has the value 54 and comes from a data unit UL-new-new, whereas the data unit having data unit number 53 is a data unit UL-old.

In a general way the following holds:

$$SN_{F\text{-}DL}(T) \leq SN_{F\text{-}DL}(F) \text{ and}$$

$$SN_{F\text{-}UL}(F) \leq SN_{F\text{-}UL}(T).$$

These data unit numbers $SN_{F\text{-}DL}(T)$, $SN_{F\text{-}DL}(F)$, $SN_{F\text{-}UL}(F)$ and $SN_{F\text{-}UL}(T)$ are given invalid values during the prolog phase. Any data unit number taken from an RLC header of a data unit is a valid value.

Rule 4: Only if $SN_{F\text{-}UL}(F)$ has obtained a valid value, can the synchronization phase in the downlink be terminated. It is terminated once the RLC layer of the side F has received acknowledgements for all the data units DL-old and DL-new, or if the maximum number of repetitions of transmissions of all the data units DL-old and DL-new was reached. Since the RLC layer of the side F knows all the data units that were sent once on the downlink at any time, it can make this decision. The end of the synchronization phase in the downlink is announced to the RRC layer of the side F via the message END-CKCS-DL-F.

The end of the synchronization phase in the downlink is shown on the side T in that data units DL-new-new with the special bit $C_K$ set to zero are sent, but are coded with the new cipher key. In FIG. 14 the first data unit sent like this has the data unit number 29. The RLC layer of the side T recognizes the end of the synchronization phase in the downlink from the fact that the data unit number of the data unit which was received with the special bit $C_K$ set to zero is greater than or equal to the stored value $SN_{F-DL}(T)$.

After the end of the synchronization phase in the downlink, the RLC layer of the side F sends all the data units coded with the new cipher key and with the special bit $C_K$ set to zero. The RLC layer of the side T then only receives data units coded with the new cipher key.

Rule 5: The RLC layer of the side T recognizes the end of the synchronization phase in the uplink from the fact that all the data units UL-old or UL-new have either been acknowledged, or that the maximum number of transmission repetitions was reached for these data units. The end of the synchronization phase in the uplink is announced to the RRC layer of the side T via the message END-CKCS-T.

The end of the synchronization phase in the uplink is shown to the side F in that a data unit UL-new-new with the special bit $C_K$ set to zero is sent, but is coded with the new cipher key. In FIG. 14 the first data unit sent like this is the data unit number 55. The RLC layer of the side F recognizes the end of the synchronization phase in the uplink from the fact that the data unit number of the data unit, which was received with the special bit $C_K$ set to zero, is greater than or equal to the stored value $SN_{F-UL}(F)$. The end of the synchronization phase in the uplink is announced to the RRC layer of the side F via the message END-CKCS-F, so that again a new procedure CKCS can be started.

After the end of the synchronization phase in the uplink, the RLC layer of the side T sends all the data units in coded form with the new cipher key and with the special bit $C_K$ set to zero. The RLC layer of the side F then only receives data units coded with the new cipher key.

By using the special bit $C_K$ it is achieved that the procedure CKCS does not cause any interruption of the transmission. Without the use of the stored values $SN_{F-DL}(T)$, $SN_{F-DL}(F)$, $SN_{F-UL}(F)$ and $SN_{F-UL}(T)$, the procedure CKCS cannot be terminated without any errors.

The invention claimed is:

1. A wireless network, comprising:
  a radio network controller; and
  a terminal,
  wherein the radio network controller is for transmitting a first message to the terminal, the first message at least indicating an initiation of a cipher key change, and
  wherein the terminal is for transmitting a second message to the radio network controller upon or subsequent to reception of the first message by the terminal, the second message being coded with a new cipher key as an acknowledgement of the cipher key change by the terminal, and
  wherein the radio network controller is for transmitting a third message to the terminal upon or subsequent to reception of the second message by the radio network controller, the third message at least indicating a deciphering by the radio network controller of the second message with the new cipher key or a failure by the radio network controller to decipher the second message with the new cipher key.

2. The wireless network of claim 1, wherein the first message includes the new cipher key.

3. The wireless network of claim 1, wherein the third message is coded with the new cipher key as an indication that the radio network controller deciphered the second message with the new cipher key.

4. The wireless network of claim 1, wherein the radio network controller includes means for verifying a use of the new cipher key by the terminal subsequent to a reception of the second message by the radio network controller.

5. The wireless network of claim 1, wherein the radio network controller and the terminal include means for synchronizing a conversion from an old cipher key to the new cipher key.

6. The wireless network of claim 1, wherein the third message is coded with an old cipher key as an indication that the radio network controller failed to decipher the second message with the new cipher key.

7. A radio network controller, comprising:
  means for transmitting a first message to a terminal, the first message at least indicating an initiation of a cipher key change;
  means for receiving a second message from the terminal upon or subsequent to reception of the first message by the terminal, the second message being coded with a new cipher key as an acknowledgement of the cipher key change by the terminal; and
  means for transmitting a third message to the terminal upon or subsequent to reception of the second message by the radio network controller, the third message at least indicating a deciphering by the radio network controller of the second message with the new cipher key or a failure by the radio network controller to decipher the second message with the new cipher key.

8. The radio network controller of claim 7, wherein the first message includes the new cipher key.

9. The radio network controller of claim 7, wherein the third message is coded with the new cipher key as an indication that the radio network controller deciphered the second message with the new cipher key.

10. The radio network controller of claim 7, wherein the radio network controller further includes means for verifying a use of the new cipher key by the terminal subsequent to a reception of the second message by the radio network controller.

11. The radio network controller of claim 7, wherein the radio network controller includes means for synchronizing a conversion from an old cipher key to the new cipher key.

12. The radio controller network of claim 7, wherein the third message is coded with an old cipher key as an indication that the radio network controller failed to decipher the second message wit the new cipher key.

13. A terminal, comprising:
  means for receiving a first message from a radio network controller, the first message at least indicating an initiation of a cipher key change;
  means for transmitting a second message to the radio network controller upon or subsequent to reception of the first message by the terminal, the second message being coded with a new cipher key as an acknowledgement of the cipher key change by the terminal; and
  means for receiving a third message from the radio network controller upon or subsequent to reception of the second message by the radio network controller, the third message at least indicating a deciphering by the radio network controller of the second message with the new cipher key or a failure by the radio network controller to decipher the second message with the new decipher key.

14. The terminal of claim 13, wherein the terminal includes means for synchronizing a conversion from an old cipher key to the new cipher key.

15. A method of operating a wireless network including a radio network controller and a terminal, the method comprising the steps of:
- transmitting, via the radio network controller, at least a first message to the terminal, the first message at least indicating an initiation of a cipher key change;
- transmitting, via the terminal, a second message to the radio network controller upon or subsequent to a reception of the first message by the terminal, the second message being coded with either an old cipher key or a new cipher key as an acknowledgement of the cipher key change; and
- transmitting, via the radio network controller, a third message to the terminal upon or subsequent to a reception of the second message by the radio network controller, the third message at least indicating a deciphering by the radio network controller of the second message with the new cipher key or a failure by the radio network controller to decipher the second message with the new decipher key.

16. The method of claim 15, wherein the third message is coded with one of an old cipher key or a new cipher key so as to indicate either a successful or an unsuccessful termination of the cipher key change.

17. The method of claim 15, further comprising:
- the radio network controller and the terminal validating the new cipher key.

18. The method of claim 15, further comprising:
- the radio network controller and the terminal synchronizing a conversion of the old cipher key to the new cipher key.

19. A radio network controller, comprising:
- means for transmitting a first message to a terminal, the first message at least indicating an initiation of a cipher key change;
- means for receiving a second message from the terminal upon or subsequent to a reception of the first message by the terminal, the second message being coded with either of an old cipher key or a new cipher key as an acknowledgement of the cipher key change by the terminal; and
- means for transmitting a third message to the terminal upon or subsequent to a reception of the second message by the radio network controller, the third message at least indicating a deciphering by the radio network controller of the second message with the new cipher key or a failure by the radio network controller to decipher the second message with the new decipher key.

20. The radio network controller of claim 19, wherein the third message is coded with one of an old cipher key or a new cipher key so as to indicate either a successful or an unsuccessful termination of the cipher key change.

21. The radio network controller of claim 19, further comprising:
- means for validating the new cipher key.

22. The radio network controller of claim 19, further comprising:
- means for synchronizing a conversion of the old cipher key to the new cipher key.

23. A terminal, comprising:
- means for receiving a first message from a radio network controller, the first message at least indicating an initiation of a cipher key change involving an old cipher key and a new cipher key; and
- means for transmitting a second message to the radio network controller upon or subsequent to a reception of the first message by the terminal, the second message being coded with one of the old cipher key or the new cipher key as an acknowledgement of the cipher key change by the terminal; and
- means for receiving a third message from the radio network controller upon or subsequent to a reception of the second message by the radio network controller, the third message being coded with one of the old cipher key or the new cipher key as an indication of one of a successful termination of an unsuccessful termination of the cipher key change.

24. The terminal of claim 23, further comprising:
- means for validating the new cipher key.

25. The terminal of claim 23, further comprising means for synchronizing a conversion of the old cipher key to the new cipher key.

* * * * *